US006307687B1

United States Patent
Nishikawa

(10) Patent No.: US 6,307,687 B1
(45) Date of Patent: Oct. 23, 2001

(54) OPTICAL PICKUP DEVICE CAPABLE OF ACCURATE TRACKING WITH SIMPLE STRUCTURE

(75) Inventor: Masayuki Nishikawa, Higashiosaka (JP)

(73) Assignee: Sharp Kabushiki Kaisha (JP)

( * ) Notice: Subject to any disclaimer, the term of this patent is extended or adjusted under 35 U.S.C. 154(b) by 0 days.

(21) Appl. No.: 09/569,243

(22) Filed: May 11, 2000

(30) Foreign Application Priority Data

May 11, 1999 (JP) .................................................. 11-129534

(51) Int. Cl.[7] ................................. G02B 7/02; G11B 7/00
(52) U.S. Cl. ......................... 359/814; 359/813; 359/824; 369/44.14; 369/112.24
(58) Field of Search ..................................... 359/814, 813, 359/822, 823, 824, 694, 696; 369/112.24, 44.14, 44.15

(56) References Cited

U.S. PATENT DOCUMENTS 5,764,613 * 6/1998 Yamamoto et al. .................. 369/112
6,058,095 * 5/2000 Yamamoto et al. .................. 369/112
6,115,347 * 12/2000 Chimura et al. ..................... 369/112
6,160,768 * 12/2000 Yanagawa .............................. 369/13

FOREIGN PATENT DOCUMENTS 10-255290    9/1998 (JP) .

* cited by examiner

*Primary Examiner*—Georgia Epps
*Assistant Examiner*—Saeed Seyrafi
(74) *Attorney, Agent, or Firm*—Dike, Bronstein, et al. of Edwards & Angell; David G. Conlin

(57) ABSTRACT

A two-group lens is comprised of a first lens and a second lens. The first lens is driven in an optical-axis direction by a magnetic circuit including a variable-distance use coil. As the first lens is driven, the second lens is also driven in an opposite direction to the first lens by a magnetic circuit including a mass-body driving coil, where the center-of-gravity position of movable part of an objective lens driver is kept at a generally constant position. The variable-distance use coil is disposed with the same gap as the mass-body driving coil. Thus, the distance between the first lens and the second lens can be held constant with a simple structure, without involving any complex structure, so that an accurate tracking can be achieved.

6 Claims, 4 Drawing Sheets

OPTICAL PICKUP DEVICE CAPABLE OF ACCURATE TRACKING WITH SIMPLE STRUCTURE

BACKGROUND OF THE INVENTION

The present invention relates to an optical pickup device using an objective lens which is a two-group lens comprised of a first lens and a second lens. More particularly, the invention relates to an optical pickup device in which the distance between the first lens and the second lens is variable and in which the objective lens is driven in focusing and tracking directions.

Conventionally, as a recording medium for information signals, there have been proposed various optical recording media such as so-called optical disks, magneto-optical disks or optical cards. Further, there has been proposed an optical pickup in which light from a light source is beamed onto such an optical recording medium as described above to implement write and read of information signals on a signal recording surface of the optical recording medium. This optical pickup is capable of converging light onto the signal recording surface of the optical recording medium with a reduced beam diameter of the light by enlarging the numerical aperture (NA) of the objective lens, and thus capable of improving the information recording density of the optical recording medium.

In the case of a single lens used as this objective lens, refractive power would be required in an attempt to obtain a high numerical aperture. However, enlarging the refractive power would cause the curvature of the lens surface to decrease, making positioning accuracy between refraction planes stricter. From these and other reasons, the numerical aperture of the single lens has hitherto been limited to about 0.6.

In an optical disk, which is an optical recording medium, if the thickness of a protective layer that protects the signal recording surface deviates from a specified value, spherical aberration largely changes. At the same time, the spherical aberration is proportional to the fourth power of the numerical aperture, neglecting the terms of higher orders. Therefore, with the numerical aperture of the objective lens increased, manufacturing tolerance for the protective layer thickness of the disk would be narrower.

In contrast to this, with the use of a two-group lens, the tolerance for design of the protective layer thickness of the disk can be a wide one while a high numerical aperture is enabled. For this reason, attention has been paid to use of a two-group lens as a high numerical aperture objective lens.

Among pickup devices using a two-group lens as shown above, one described in Japanese Patent Laid-Open Publication HEI 10-255290 is shown in FIG. 6 in its structure.

The two-group lens is comprised of a first lens 102, and a second lens 103 opposed to the first lens 102 with a gap 119 provided therebetween. Further, the two-group lens 120 is equipped with a variable-distance driver 116 for making the distance between the first lens 102 and the second lens 103 variable.

Also, the two-group lens 120 includes, in addition to the first lens 102 and the second lens 103, a generally cylindrical bobbin 118 for holding the first lens 102 with an outer peripheral portion of the first lens 102 fitted thereto, a yoke 110 disposed at a disk-side outer peripheral portion of the second lens 103 with the gap 119 formed against the bobbin 118, a coil 111 wound around an outer peripheral portion of the bobbin 118, a magnet 112 mounted on the yoke 110 and spaced from the coil 111, a spring 113 for mechanically coupling the bobbin 118 and the yoke 110 to each other, and a protective material 115 disposed at an outer peripheral portion of a disk-side surface of the first lens 102.

An electric current, when applied to this coil 111, causes a Lorentz force to be generated in combination with magnetic fields generated by the magnet 112 facing the coil 111. The spring 113 mechanically couples the bobbin 118 and the yoke 110 together, thereby elastically supporting the bobbin 118 against the yoke 110. Also, the spring 113 supports the bobbin 118 so that the bobbin 118 is movable only in the optical-axis direction. Then, in the two-group lens 120, the bobbin 118, the yoke 110, the coil 111, the magnet 112 and the spring 113 constitute a so-called voice coil motor, thereby forming part of the variable-distance driver 116. That is, in the two-group lens 120, the distance between the second lens 103 and the first lens 102 that is elastically supported against this second lens 103 via the yoke 110, the spring 113 and the bobbin 118 with a degree of freedom in the optical-axis direction is made variable by the variable-distance driver 116 driven by the Lorentz force generated between the coil 111 and the magnet 112. In addition, in the optical pickup, the two-group lens 120 equipped with the variable-distance driver 116 is supported by an objective-lens driving actuator so as to be movable in a direction along the optical axis of a laser beam emitted by a semiconductor laser as well as in a direction vertical to the optical axis.

When the lens-to-lens distance of the two-group lens is made variable depending on the protective layer thickness and refractive index as in the above-shown prior art, the center-of-gravity position of the movable part in the objective-lens driver varies in the optical-axis direction.

In this case, when an external force in the tracking direction is applied by the objective-lens driver, there occurs a rolling about an axis vertical to the optical-axis direction and to the tracking direction. Further, whereas a relatively small amount of rolling results for a small moving velocity in the tracking direction, increasing the moving velocity higher causes the rolling amount to increase and moreover resonance of the rolling mode to occur, thus making correct tracking no longer implementable.

Also, since the current to be applied to the variable-distance driver depending on differences in protective layer thickness and refractive index is passed generally in DC manner, there is a further problem of increased electric power consumption.

The present invention having been achieved in view of the above circumstances, an object of the invention is to provide an objective lens for use in an optical pickup, the objective lens being a two-group lens comprised of a first lens and a second lens, in which objective lens the resonance of a rolling mode due to a shift between a point of action in the tracking direction and the center of gravity resulting from driving operation by the variable-distance driver is suppressed within a controllable range so that an accurate tracking can be achieved, and further in which objective lens the value of electric current applied to the variable-distance driver is reduced so that the distance between the first lens and the second lens can be ensured with a simple structure, thus the objective lens having a compact constitution.

SUMMARY OF THE INVENTION

In order to achieve the object, there is provided an optical pickup device having: an objective lens comprised of a first lens having a surface facing an information recording medium and a second lens on which a beam derived from a light source becomes incident; an objective lens driver for driving the objective lens in an optical-axis direction and in a direction vertical to the optical axis; and a variable-distance driver for changing a distance between the first lens and the second lens, the optical pickup device further comprising:

a mass body driver for driving a portion of movable part of the objective lens driver in such a way that when the distance between the first lens and the second lens is changed by the variable-distance driver, a center-of-gravity position of the movable part of the objective lens driver is located generally coincident with a point of action of driving forces in the optical-axis direction and in the direction vertical to the optical axis generated by the objective lens driver, or closer to the light source than the point of action.

According to the above construction, when the distance between the first lens and the second lens is changed, the center of gravity of the movable part of the objective lens driver is located coincident with or closer to the light source than the point of action of driving forces in the optical-axis direction of light and in a direction vertical to the optical axis. Therefore, resonance of the rolling mode can be suppressed within a controllable range during the drive in the tracking direction, thus making an accurate tracking achievable.

Also, even when information is recorded or reproduced on optical disks having different thicknesses of the protective layer, an accurate tracking can be achieved.

In one embodiment of the present invention, the variable-distance driver and the mass body driver each generate a driving force by a magnetic circuit including a coil and a magnet, and the coils of the variable-distance driver and the mass body driver are electrically connected in series to each other.

According to this construction, since the coils of the variable-distance driver and the mass body driver can be coupled in series so that power feed can be given in one system, the number of component parts can be reduced and the structure can be simplified.

In one embodiment of the present invention, the variable-distance driver and the mass body driver each generate a driving force by a magnetic circuit including a coil and a magnet, and the variable-distance driver and the mass body driver share the same magnet.

According to this construction, when magnetic circuits for magnets and the like are commonized, a reduction in the number of component parts can be attained so that the whole equipment can be reduced in size and weight, thus allowing a cost reduction and an assembly simplification to be easily achieved.

In one embodiment of the present invention, the variable-distance driver drives either one of the first lens and the second lens in the optical-axis direction; and the mass body driver drives a lens other than the lens that is driven by the variable-distance driver in a direction opposite to a direction of drive by the variable-distance driver.

According to this construction, since the mass body driver drives a lens other than the lens that is driven by the variable-distance driver, the distance between the two lenses can be largely changed, so that disks having largely different protective layer thicknesses and refractive indices can be managed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described in detail with reference to the accompanying drawings.

Figure 1:
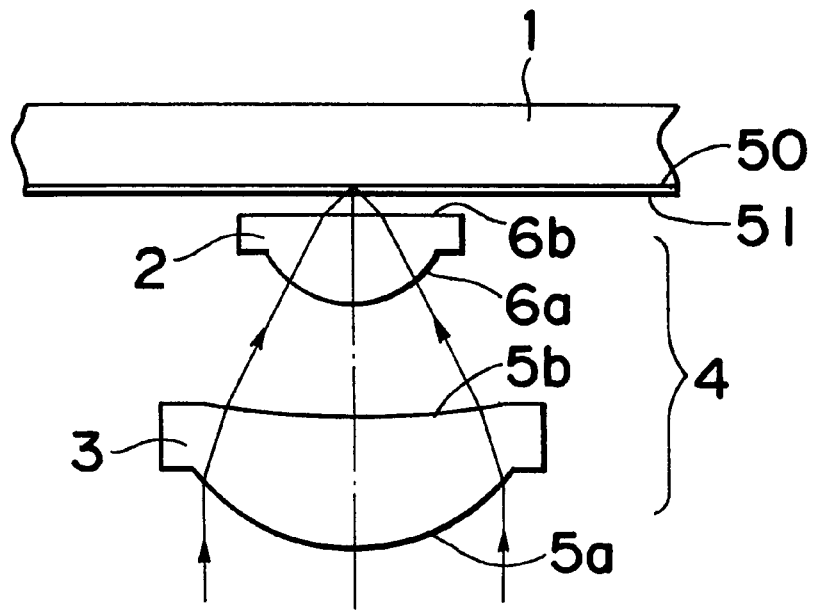
FIG. 1 is a view for explaining a two-group lens constituting an objective lens of the optical pickup device.

FIG. 1 is a schematic view for outlining an optical pickup device of this embodiment. The optical pickup device has a two-group lens 4 comprised of a first lens 2 and a second lens 3 opposed to the first lens 2. Such a two-group lens 4 comprised of the first lens 2 and the second lens 3 is capable of generating a numerical aperture of, for example, 0.85.

The second lens 3 has a first surface 5a to which a laser beam is inputted from a semiconductor laser, and a second surface 5b from which the laser beam inputted from the first surface 5a is outputted toward the first lens 2. Then the first lens 2 has a first surface 6a on which the laser beam is inputted from the second surface 5b of the second lens 3, and a second surface 6b from which the laser beam inputted from the first surface 6a is outputted toward a disk 1. The outputted laser beam penetrates a protective layer 51 and converged on an information recording medium 50. The two-group lens 4 is equipped with a variable-distance driver (not shown in FIG. 1) for making the distance between the first lens 2 and the second lens 3 variable.

Figure 7:
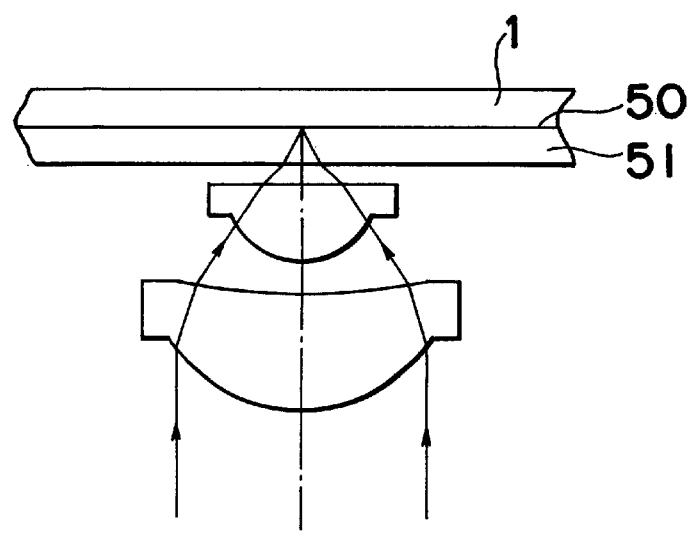
FIG. 7 is an explanatory view showing how the lens-to-lens distance is varied.

Then, when the thickness of the protective layer 51 increases or decreases, the lens-to-lens distance is changed by the variable-distance driver as shown in FIG. 7 (where the protective layer 51 is thick) in order to reduce the aberration caused by the change in the protective layer thickness.

In addition, the two-group lens and the variable-distance driver are mounted on an objective lens driver which will be described later.

Next, the objective lens driver, the variable-distance driver and a mass body driver are described in detail.

Figure 2:
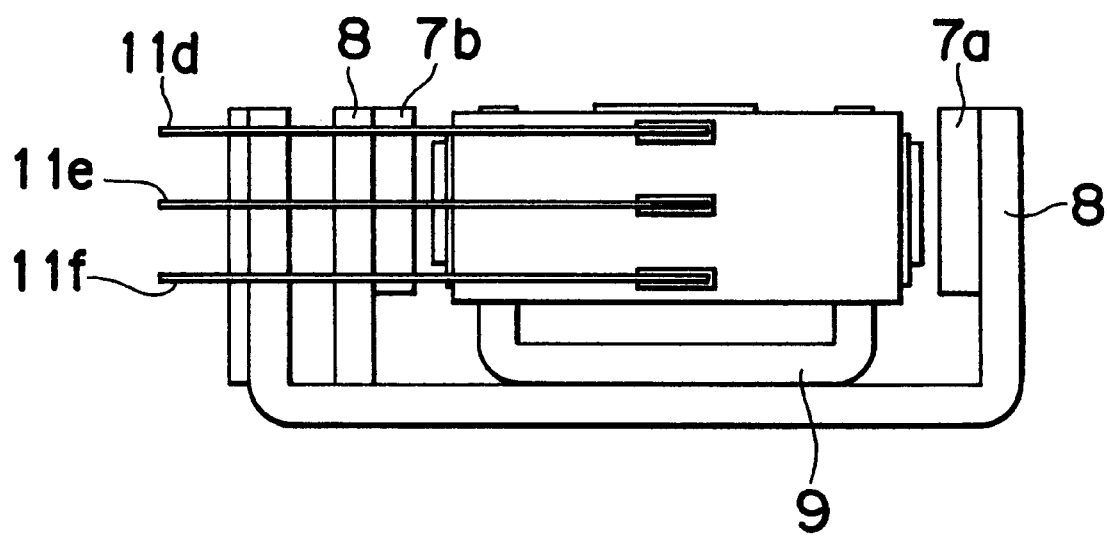
FIG. 2 is a side view of a variable-distance driver and an objective lens driver in the optical pickup device of FIG. 1.
Figure 3:
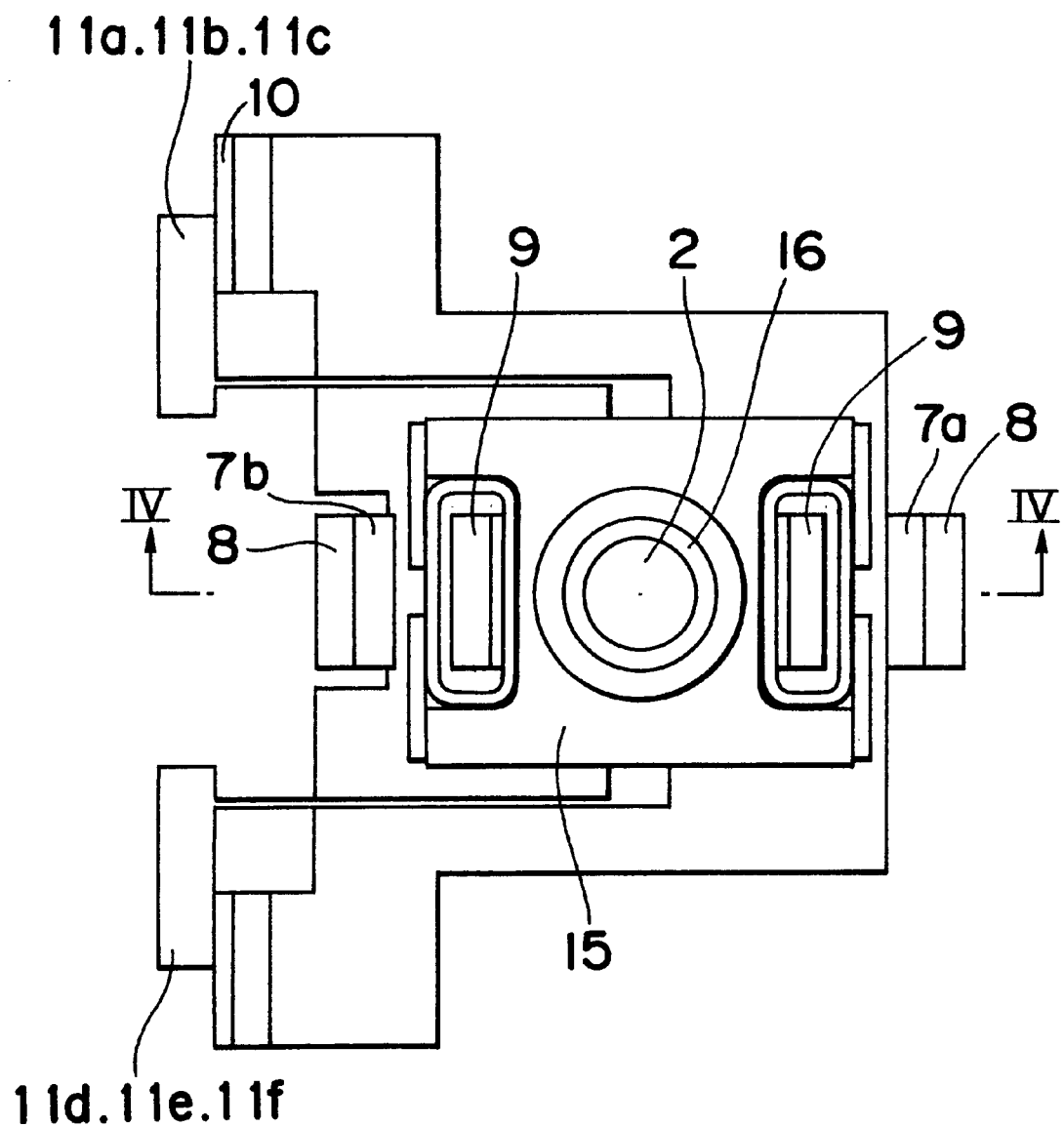
FIG. 3 is a top view of the variable-distance driver and the objective lens driver in the optical pickup device of FIG. 1.
Figure 4:
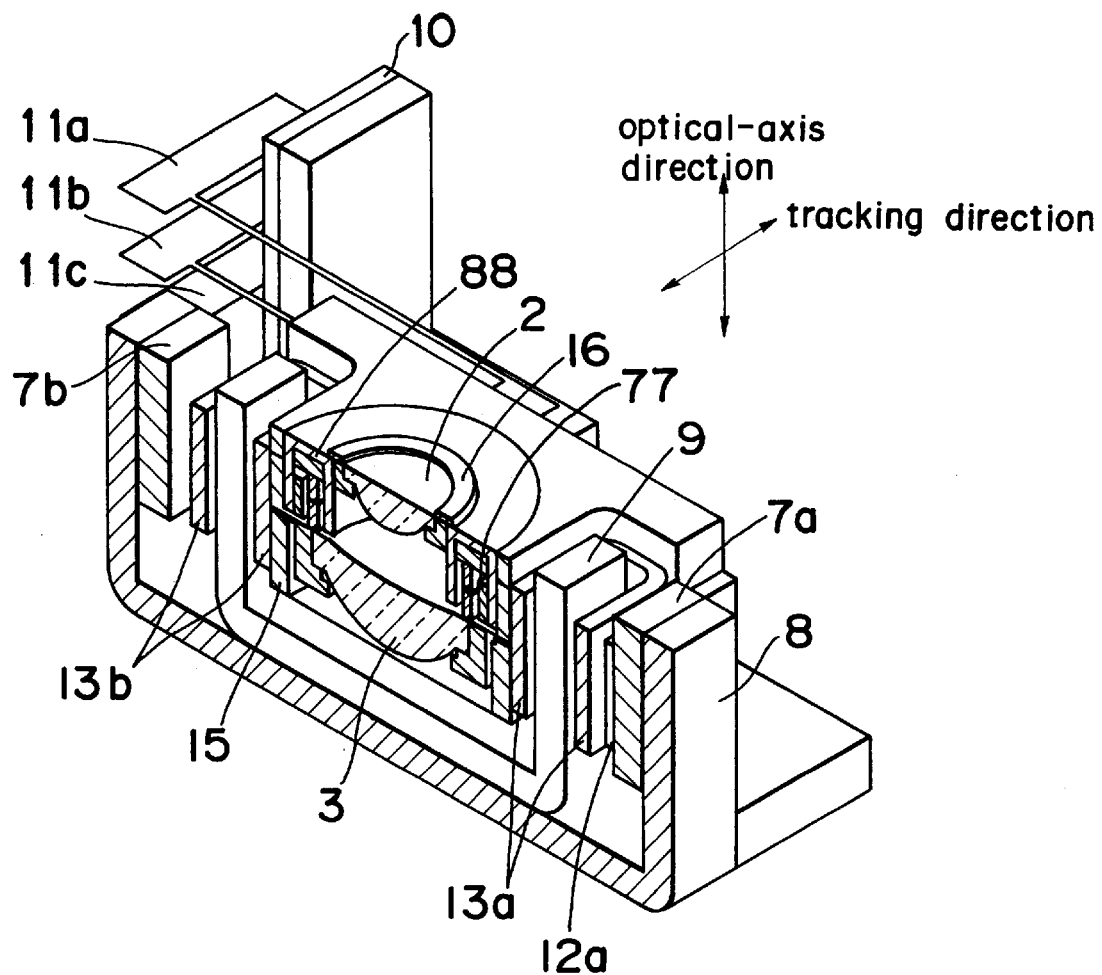
FIG. 4 is a perspective view taken along the line IV—IV of FIG. 3.
Figure 5:
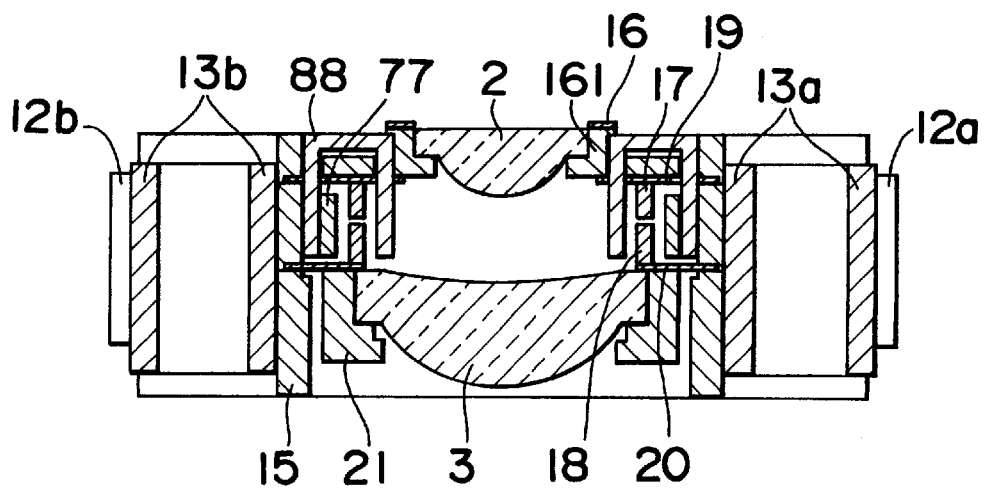
FIG. 5 is a sectional side view of movable part of the objective lens driver.
Figure 6:
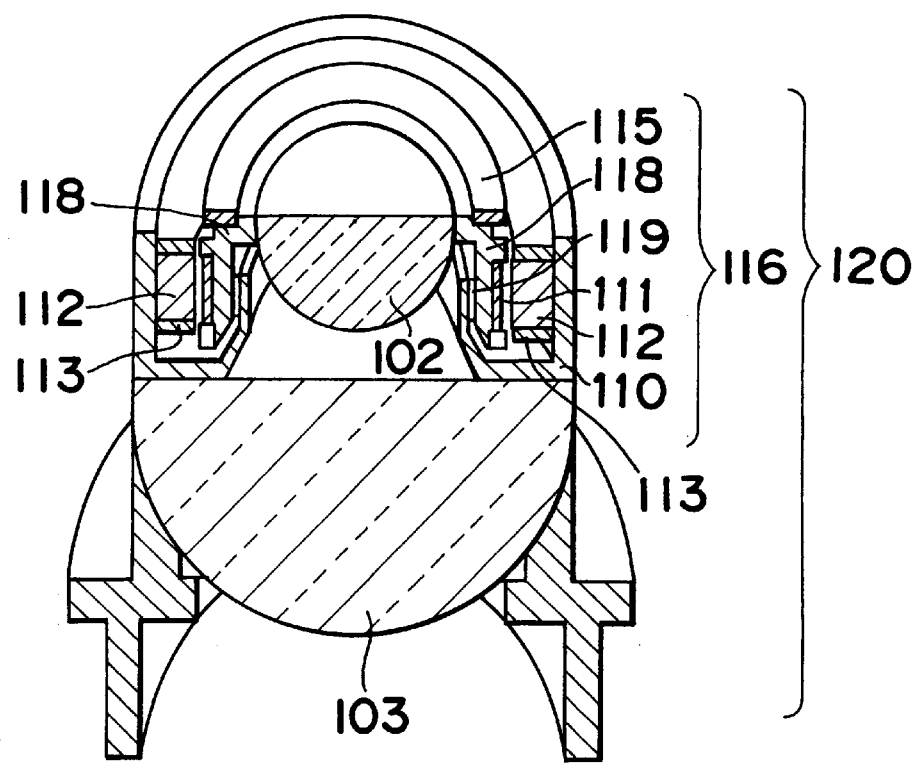
FIG. 6 is a view for explaining a conventional two-group lens.

FIG. 2 is a side view of this optical pickup device, and FIG. 3 is a top view thereof. FIG. 4 is a perspective view taken along the line IV—IV of FIG. 3. FIG. 5 is a sectional schematic view showing movable part of the objective lens driver. In addition, FIG. 4 explicitly shows the optical-axis direction and the tracking direction.

First of all, the objective lens driver is explained.

A second yoke 9 is disposed on a first yoke 8, and magnets 7a, 7b are mounted on the yoke 8. There are gaps between the magnet 7a and the second yoke 9 and between the magnet 7b and the second yoke 9. It is noted that the first yoke 8 and the second yoke 9 are made from magnetic material. Since the magnets 7a, 7b are magnetized in a direction vertical to both the optical-axis direction and the tracking direction, magnetic fields are generated in the gaps along a direction vertical to both the optical-axis direction and the tracking direction.

As shown in FIG. 4, focusing coils 13a, 13b and tracking coils 12a, 12b of the objective lens driver mounted on an objective-lens holding member 15 are disposed in those gaps. Passing an electric current through the focusing coils 13a, b causes the objective-lens holding member 15 to be driven in the optical-axis direction, and passing an electric current through the tracking coils 12a, 12b causes the objective-lens holding member 15 to be driven in the tracking direction, by action of generated driving force.

A through hole is formed so as to be larger than the diameter of the first lens 2, and a lens protection member 16 is disposed with the first lens 2 placed in the hole. The lens protection member 16 is formed of a felt having a low dusting characteristic or a member having a small frictional coefficient relative to the protective layer so that the lens is prevented from colliding directly against the protective layer of the disk.

As shown in FIG. 3, a printing circuit board 10 is mounted at a site where part of the second yoke 9 is bent toward the optical-axis direction. Objective-lens supporting elastic members 11a–f placed vertical to the optical-axis direction and parallel to the disk tangent direction are installed at the sites of the objective-lens holding member 15 and the printing circuit board 10 with solder, and the objective-lens holding member 15 is movable in the optical-axis direction and the tracking direction. The objective-lens supporting elastic members 11a–f also have a function of conducting electric current to the tracking coils 12a, 12b, the focusing coils 13a, 13b, and later-described variable-distance use coil 17 and mass-body driving coil 18.

With such an arrangement, substituting a four-wire objective lens driver also in this case becomes possible, thus allowing cost increase to be suppressed.

Next, the variable-distance driver is explained.

As shown in FIG. 5, the first lens 2 is held by a first-lens holding member 161. In the first-lens holding member 161, a lens-supporting elastic member 19 is disposed in one plane vertical to the optical-axis direction, and the other end of the lens-supporting elastic member 19 is held by the objective-lens holding member 15, where the first-lens holding member 161 and the first lens 2 are movable relative to the objective-lens holding member 15 only in the optical-axis direction. The variable-distance use coil 17 is disposed on the lens-supporting elastic member 19 along the optical-axis direction, and mounted via the lens-supporting elastic member 19 on the first-lens holding member 161. A common yoke 88 is mounted on the objective-lens holding member 15, and a common magnet 77 is mounted on the common yoke 88. There is a gap between the common magnet 77 and the common yoke 88. It is noted that the common yoke 88 is made from magnetic material. The variable-distance use coil 17 is disposed in this gap, constituting a so-called voice coil motor. A mass-body driving coil 18 of a later-described mass body driver is disposed also in this gap. When the variable-distance use coil 17 is electrified, driving force is generated in the optical-axis direction, causing the first-lens holding member 161 to be driven in the optical-axis direction, with the result that lens-to-lens distance between the first lens 2 and the second lens 3 is changed.

Next, the mass body driver is explained.

The mass body driver has a function of displacing the mass body in order to suppress changes of the center-of-gravity position due to changes of the lens-to-lens distance between the first lens 2 and the second lens 3 caused by the variable-distance driver. It is noted here that the mass body may be any constitute part of the two-group lens or a weight provided to change the center-of-gravity position.

In this embodiment, the movable part of the mass body driver includes the second lens 3 as a portion thereof. This is explained concretely below.

The movable part of the mass body driver is comprised of the second lens 3 and a second-lens holding member 21 which holds the second lens 3. In the second-lens holding member 21, a second-lens supporting elastic member 20 is disposed in one plane vertical to the optical-axis direction, and the other end of the lens-supporting elastic member 20 is held by the objective-lens holding member 15, where the second-lens holding member 21 and the second lens 3 are movable relative to the objective-lens holding member 15 only in the optical-axis direction. The mass-body driving coil 18 is disposed in the gap between the common magnet 77 and the common yoke 88. When the mass-body driving coil 18 is electrified, driving force is generated in the optical-axis direction, causing the second-lens holding member 21 to be driven in the optical-axis direction.

The variable-distance use coil 17 and the mass-body driving coil 18 are disposed circularly about the optical axis and connected in series. When electrified, the variable-distance use coil 17 and the mass-body driving coil 18 have electric currents flowing therethrough in opposite directions to each other about the optical axis. Therefore, when the variable-distance use coil 17 and the mass-body driving coil 18 are electrified, the direction of driving force for the variable-distance driver and the direction of driving force for the mass body driver are along the optical axis and opposite to each other. With such an arrangement adopted, a magnetic gap can be commonized between the variable-distance use coil 17 and the mass-body driving coil 18, thus making it possible to reduce the number of component parts for magnets and yokes.

Further, since the variable-distance use coil 17 and the mass-body driving coil 18 are connected in series, two wire springs may be used for the flowing current of the variable-distance use coil 17 and the mass-body driving coil 18.

Further, since the first lens 2 and the second lens 3 are driven in directions opposite to each other, it is easy to enlarge the lens-to-lens distance therebetween.

In this embodiment, with no currents applied to the variable-distance driver and the mass body driver, i.e., with no driving force generated, the lens-to-lens distance between the first lens and the second lens falls between maximum and minimum values which can occur due to differences in the protective layer thickness and refractive index of the information recording medium. With such an arrangement, driving force values required to attain the maximum and minimum values of the lens-to-lens distance can be made smaller, thus allowing the means for generating the driving force to be reduced in size or cost and lowered in power consumption.

Also, either while no currents are applied to the variable-distance driver and the mass body driver, i.e., with no driving force generated, or while currents are applied to the variable-distance driver and the mass body driver, the center of gravity of the movable part of the objective lens driver is located coincident with a point of action of driving forces in the focusing and tracking directions of the objective lens driver or closer to the light source than the point of action. Then, in this embodiment, since the first lens 2 and the second lens 3 are driven in directions opposite to each other along the optical-axis direction by the mass body driver, it is attainable to reduce the movement of the center of gravity of the movable part of the objective lens driver (i.e., to keep the center of gravity of the movable part at a generally constant position). As a result of this, resonance of the rolling mode can be suppressed within a controllable range while the objective lens driver drives the movable part in the tracking direction, thus making an accurate tracking achievable.

In the embodiment described above, the mass body driver drives a part including the second lens 3, so that the center-of-gravity position of the objective lens driver is kept at a generally constant position. However, for the present invention, without being limited to this arrangement, it is required only that when the distance between the first lens 2 and the second lens 3 is changed, the center-of-gravity position of the movable part be located generally coincident with a point of action of driving forces in the optical-axis direction and a direction vertical to the optical axis by the objective lens driver, or closer to the light source than the point of action, by driving at least a portion of the movable part of the objective lens driver. With this arrangement, resonance of the rolling mode can be suppressed within a controllable range during the drive in the tracking direction, thus making an accurate tracking achievable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device having: an objective lens comprised of a first lens having a surface facing an information recording medium and a second lens on which a beam derived from a light source becomes incident; an objective lens driver for driving the objective lens in an optical-axis direction and in a direction vertical to the optical-axis; and a variable-distance driver for changing a distance between the first lens and the second lens, the optical pickup device further comprising:

a mass body driver for driving a portion of movable part of the objective lens driver in such a way that when the distance between the first lens and the second lens is changed by the variable-distance driver, a center-of-gravity position of the movable part of the objective lens driver is located generally coincident with a point of action of driving forces in the optical-axis direction and in the direction vertical to the optical-axis generated by the objective lens driver, or closer to the light source than the point of action.

2. The optical pickup device according to claim 1, wherein the variable-distance driver and the mass body driver each generate a driving force by a magnetic circuit including a coil and a magnet, and the coils of the variable-distance driver and the mass body driver are electrically connected in series to each other.

3. The optical pickup device according to claim 1, wherein the variable-distance driver and the mass body driver each generate a driving force by a magnetic circuit including a coil and a magnet, and the variable-distance driver and the mass body driver share the same magnet.

4. The optical pickup device according to claim 1, wherein the variable-distance driver drives either one of the first lens and the second lens in the optical-axis direction; and the mass body driver drives a lens other than the lens that is driven by the variable-distance driver in a direction opposite to a direction of drive by the variable-distance driver.

5. The optical pickup device according to claim 2, wherein the variable-distance driver drives either one of the first lens and the second lens in the optical-axis direction; and the mass body driver drives a lens other than the lens that is driven by the variable-distance driver in a direction opposite to a direction of drive by the variable-distance driver.

6. The optical pickup device according to claim 3, wherein the variable-distance driver drives either one of the first lens and the second lens in the optical-axis direction; and the mass body driver drives a lens other than the lens that is driven by the variable-distance driver in a direction opposite to a direction of drive by the variable-distance driver.

* * * * *